April 20, 1954  G. BIRKBECK ET AL  2,676,236
MAGNETOSTRICTION TRANSDUCER
Filed March 23, 1951
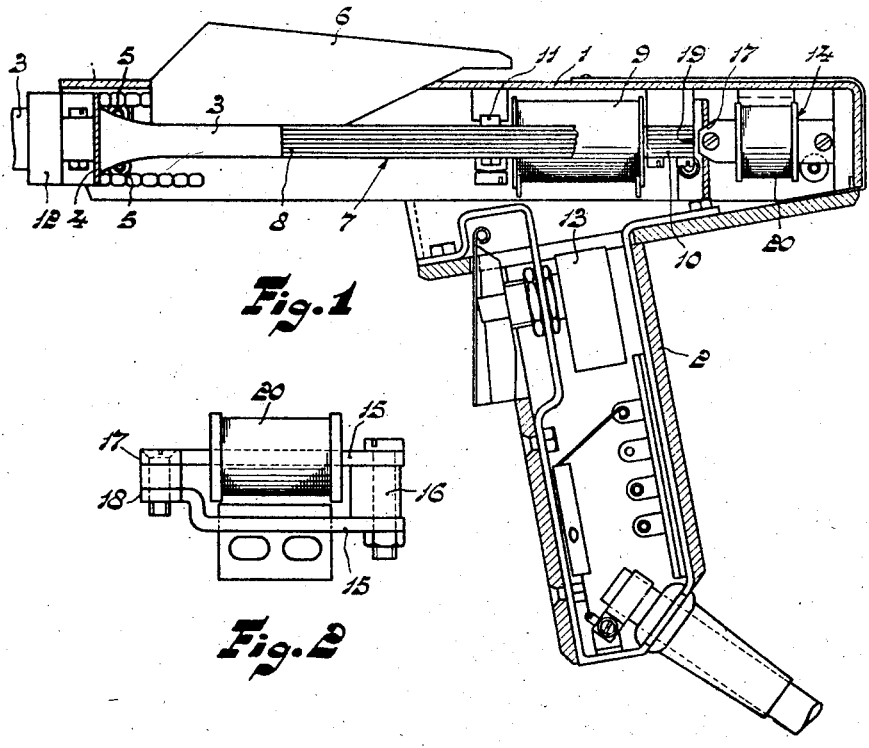
INVENTOR.
Guy Birbeck
David James Tremlett
Bernard Edward Noltingk
Ernest Arthur Neppiras
By
AGENT Patented Apr. 20, 1954

2,676,236

UNITED STATES PATENT OFFICE 2,676,236

MAGNETOSTRICTION TRANSDUCER

Guy Birkbeck, David James Tremlett, Bernard Edward Noltingk, and Ernest Arthur Neppiras, Reigate, England, assignors to Hartford National Bank and Trust Company, Hartford, Conn., as trustee Application March 23, 1951, Serial No. 217,242

Claims priority, application Great Britain March 31, 1950

3 Claims. (Cl. 219—26)

The invention relates to magneto-striction transducers and more particularly but not exclusively to soldering apparatus employing transducers of this type.

There has heretofore been known a soldering iron for manual use which is particularly adapted for the soldering of "difficult" metals e. g. aluminium which comprises a body having a hand grip portion the body carrying an electrically heated bit mounted so as to be capable of vibrations in relation to the body and an electromechanical transducer also carried by the body and mechanically coupled to the bit for transmitting vibrations thereto when supplied with an alternating current of suitable frequency.

With apparatus of this type, it is necessary to generate an electric current of ultrasonic frequency and in order to keep the amount of power required to a minimum, this frequency must be variable so that it can be adjusted to the resonant frequency of the electro-mechanical transducer. This involves the provision of a thermionic valve oscillator of controllable frequency followed by a power amplifying stage or stages so that the necessary current is available.

The object of the present invention is to provide a magneto-striction oscillator in which the control of the frequency is automatic. A further object of the invention is to improve soldering irons of the type above referred to and to simplify the electric power supply means whilst rendering the control of the ultrasonic frequency automatic.

According to a first feature of the invention, apparatus for generating mechanical vibrations of ultrasonic frequency comprises a magnetostriction transducer having energising coils connected to the output of a thermionic valve amplifier supplying current or ultrasonic frequency and an electro-mechanical pick up associated with the transducer whereof the electrical output is connected to the input of the amplifier.

According to a further feature of the invention, a soldering iron for manual use comprises a body having a hand grip portion, an electrically heated bit mounted on the body so as to be capable of vibration in relation thereto, a magneto-striction transducer resiliently mounted on the body having an energising coil or coils and being mechanically coupled to the bit for transmitting vibration thereto, an electro-magnetic pick-up associated with the transducer and a thermionic valve amplifier, having its output connected to the energising coil or coils of the transducer and its input to the electro-magnetic pick-up.

Other features of the invention will be apparent from the following description of one convenient embodiment, which is given by way of example only, with reference to the accompanying drawings in which Fig. 1 is a side view partly in section of a soldering iron according to the invention.

Figure 2 is a plan view of a variable reluctance pick up and

Figure 3 is a circuit diagram.

Referring now to Figure 1, a soldering iron for manual use comprises, a body 1 of inverted channel section to which a dependent hand grip portion 2 in the form of a pistol grip is attached. The soldering bit 3 projects from one end of the body and is supported at about the mid point of its length by a diaphragm 4 secured to the side walls of the body as by bolts 5. The diaphragm is relatively stiff to provide adequate support for the bit, but is sufficiently resilient not to damp longitudinal vibrations of the bit. The portion of the bit behind the diaphragm may carry cooling fins 6 projecting through suitable apertures in the body since it is important to prevent heat flowing back from the bit to the transducer.

The inner end of the bit is secured as by brazing or clamping to the forward end of a magnetostriction transducer 7 which preferably comprises a stack of laminations 8 having a central aperture defining two parallel limbs on one of which is wound an energising coil 9. The magnetic circuit of the transducer is completed by an insert 10 between the limbs which consists preferably of a stack of laminations of high permeability material.

The transducer is supported at about the mid point of its length by the body through the medium of resilient supporting members 11 which are preferably of silicon synthetic rubber which provides the necessary resilience and is substantially unaffected by high temperature.

The actual soldering bit is electrically heated in the usual manner by electric heating elements 12, connecting wires for which and those for the transducer pass through the hand grip portion which preferably incorporates a switch 13 so that the supply of current to the transducer may be turned on and off at will.

Attached to the body at the rear end of the transducer is an electro-magnetic pick-up 14 (see Figure 2) preferably of the variable reluctance type comprising a U-shaped core 15, one part 16 of the magnetic circuit of which is formed as a permanent magnet, the end faces 17, 18 of the core being positioned closely adjacent the extreme end 19 of the laminations of the transducer. A pick-up coil 20 is mounted on one of the limbs 15 of the pick-up core and the connecting leads for this coil are brought out through the handle with the other connecting leads above mentioned. Preferably the complete pick-up unit is enclosed in a shroud (not shown) of high permeability material to prevent unwanted pick-up from the transducer energising coils.

The leads from the pick-up coil or coils are taken to the input terminals 21, 22 (Figure 3) of a thermionic valve amplifier the output of which is utilised to energise the transducer windings.

The amplifier, of which the circuit diagram is shown in Figure 3, comprises an input stage utilising a power pentode valve 32, for example, a valve known under the designation Mullard E. L. 33. This valve is operated in class "C" and its output is fed to a pair of high power output pentode valves 24, 25 arranged in parallel and also operated under class "C" conditions. A rectifier 26 supplies the necessary high tension D. C. voltage to the valves, being energized by a main transformer 27, which is provided with a plurality of secondary windings 28, 29, 30, 31 and 32. The winding 28 supplies the filament current for the valves 23, 24 and 25. The winding 29 supplies the anode voltage for the rectifier 26, the filament supply for the rectifier being derived from the winding 30. The winding 32 supplies current at the required voltage for the heater 12 (Figure 1). The winding 31 supplies current at a suitable voltage to a bridge type rectifier 33, from which is derived, after the necessary smoothing, a D. C. potential for the D. C. polarisation of the transducer.

The A. C. output of the amplifier, and the polarising D. C. potential are supplied through lead 34 to the energising coil of the transducer and the A. C. output, is controlled by switch 13 which, when closed, cuts out resistor 35 in the common cathode circuit of the output valves 24 and 25.

It will be seen that the amplifier is of normal and straightforward construction and no local oscillator is required since the feedback round the amplifier automatically provides the necessary oscillation at or substantially at the resonant frequency of the transducer. It may be desirable to adjust the frequency response of the amplifier so that vibrations in unwanted modes cannot be produced.

It will be readily apparent that the soldering iron above described may be used in the ordinary manner with readily solderable materials but by switching on the transducer the bit is caused to vibrate at a high frequency preferably ultrasonic, when the "difficult" metals for example aluminum, may be soldered.

It will be clear that the invention is not limited to the exact embodiment described, since constructional details may be varied to suit particular circumstances, as they arise in practice, for example, the bit may be provided with a detachable tip portion which can be readily replaced, since this tends to become worn, more readily than is the case with ordinary soldering irons.

What we claim is:

1. A soldering iron for manual use comprising a body having a hand grip portion, an electrically heated bit mounted on the body so as to be capable of vibration in relation thereto, a magneto-striction transducer having a vibratory element resiliently mounted on the body and having an energising coil, means mechanically coupling said element to the bit for transmitting vibration thereto whereby the resonance frequency of said transducer is influenced by said bit, an electro-magnetic pick-up mechanically linked with the transducer and a thermionic valve amplifier, having its output connected to the energising coil of the transducer and its input to the electro-magnetic pick-up.

2. An apparatus, as claimed in claim 1, wherein the thermionic valve amplifier is a two-stage amplifier operating in class "C" condition.

3. A soldering iron comprising a body having a hand grip portion, an electrically heated bit mounted on the body so as to be capable of vibration in relation thereto, a magneto-striction transducer resiliently mounted on the body having an energizing coil and being mechanically coupled to the bit for transmitting vibration thereto, an electro-magnetic pick-up associated with the transducer and a thermionic valve amplifier, having its output connected to the energizing coil of the transducer and its input to the electro-magnetic pick-up, said pick-up being of the variable reluctance type comprising a U-shaped core, one part of the magnetic circuit of which is formed as a permanent magnet and an energizing coil mounted on one of the limbs of the core.

References Cited in the file of this patent

UNITED STATES PATENTS

| Number | Name | Date |
|---|---|---|
| Re. 19,461 | Pierce | Feb. 12, 1935 |

OTHER REFERENCES

"Soldering Aluminum Alloys," Electronics, by Thomas et al., June 1948.